United States Patent
Laing et al.

(10) Patent No.: US 9,919,294 B2
(45) Date of Patent: Mar. 20, 2018

(54) PHOSPHORUS TOLERANT CATALYST WASHCOAT STRUCTURE

(71) Applicant: FORD GLOBAL TECHNOLOGIES, LLC, Dearborn, MI (US)

(72) Inventors: Paul M. Laing, Canton, MI (US); Carolyn Parks Hubbard, Canton, MI (US); Jeffrey Scott Hepburn, Birmingham, MI (US); Eva Thanasiu, Trenton, MI (US); Giovanni Cavataio, Dearborn, MI (US); Hungwen Jen, Troy, MI (US); Mark John Jagner, Ypsilanti, MI (US); Rachael Jean Harrington, Canton, MI (US); Michael Daniel Shane, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/139,726

(22) Filed: Apr. 27, 2016

(65) Prior Publication Data
US 2017/0312740 A1    Nov. 2, 2017

(51) Int. Cl.
| | |
|---|---|
| *B01D 53/94* | (2006.01) |
| *B01J 23/10* | (2006.01) |
| *B01J 23/40* | (2006.01) |
| *B01J 27/16* | (2006.01) |

(Continued)

(52) U.S. Cl.
CPC ........ *B01J 27/1804* (2013.01); *B01D 53/945* (2013.01); *B01J 23/10* (2013.01); *B01J 23/40* (2013.01); *B01J 27/16* (2013.01); *B01J 35/04* (2013.01); *B01D 2255/102* (2013.01); *B01D 2255/2063* (2013.01); *B01D 2255/2065* (2013.01); *B01D 2255/2092* (2013.01); *B01D 2255/20715* (2013.01); *B01D 2255/407* (2013.01); *B01D 2255/9032* (2013.01)

(58) Field of Classification Search
None
See application file for complete search history.

(56) References Cited

U.S. PATENT DOCUMENTS

| 7,678,347 B2 | 3/2010 | Chen |
| 7,749,472 B2 | 7/2010 | Chen et al. |

(Continued)

*Primary Examiner* — Colin W. Slifka
(74) *Attorney, Agent, or Firm* — Marla Johnston; Brooks Kushman P.C.

(57) ABSTRACT

Phosphorus tolerant or resistant three-way catalysts (TWC) are disclosed. The TWC may include a substrate defining a plurality of channels. It may include front and rear washcoat portions overlying the substrate and having respective first and second washcoat loadings, the first washcoat loading being at most 2.0 g/in$^3$ and less than the second washcoat loading. The front washcoat portion may include a catalyst material supported on a support material comprising a cerium oxide, such as ceria or CZO, or a pre-phosphated material, such as AlPO$_4$, or CePO$_4$. In one embodiment, the support material may comprise at least 85 wt. % of a cerium oxide or at least 85 wt. % of a phosphate-containing material. The front portion and the underlying substrate may comprise from 3 to 25 vol. % of the three-way catalyst or the front portion may overly up to an initial 15% of an axial length of the substrate.

20 Claims, 9 Drawing Sheets

(51) Int. Cl.
*B01J 27/18* (2006.01)
*B01J 35/04* (2006.01)

(56) References Cited

U.S. PATENT DOCUMENTS

| | | | |
|---|---|---|---|
| 2008/0038172 A1* | 2/2008 | Chen | B01D 53/945 423/213.2 |
| 2012/0128558 A1* | 5/2012 | Nunan | B01D 53/945 423/213.5 |
| 2014/0369912 A1* | 12/2014 | Zheng | B01J 23/63 423/213.5 |
| 2015/0033715 A1 | 2/2015 | Markatou et al. | |
| 2015/0196902 A1 | 7/2015 | Golden et al. | |
| 2015/0367328 A1 | 12/2015 | Ikeda et al. | |

\* cited by examiner

PHOSPHORUS TOLERANT CATALYST WASHCOAT STRUCTURE

TECHNICAL FIELD

The present disclosure relates to phosphorus tolerant catalyst washcoat structures, for example, for use in vehicle exhaust systems.

BACKGROUND

Under cold start conditions, most gasoline and diesel vehicles emit hydrocarbon, carbon monoxide, and nitrogen oxide (NOx) emissions before the exhaust catalyst has achieved light-off temperature (e.g., before it is fully functioning). Increases in engine efficiency and increased use of turbocharging may exacerbate this problem because less exhaust gas heat may be available to the three-way catalyst (TWC), thereby increasing the time it takes the catalyst to reach a light-off temperature. A TWC is typically comprised of a washcoat loaded onto a support material, such as a cordierite substrate. Both the substrate and the washcoat contribute to the total thermal mass of the catalyst. Reducing substrate thermal mass has been utilized as a method to reduce the heat capacity of the catalyst, potentially resulting in faster catalyst light-off.

SUMMARY

In at least one embodiment, a three-way catalyst (TWC) is provided. The TWC may include a substrate defining a plurality of channels; front and rear washcoat portions overlying the substrate and having respective first and second washcoat loadings, the first washcoat loading being at most 2.0 g/in$^3$ and less than the second washcoat loading; and the front washcoat portion including a catalyst material supported on a support material comprising at least 85 wt. % of a cerium oxide.

In one embodiment, the support material comprises at least 95 wt. % of a cerium oxide. The cerium oxide may include at least one of $CeO_2$ and a cerium zirconium oxide (CZO). The support material may exclude alumina. In one embodiment, the front washcoat portion and a portion of the substrate that it overlies comprise from 3 to 25 vol. % of the three-way catalyst. In another embodiment, the front washcoat portion overlies up to 15% of an axial length of the substrate. The catalyst material may include a platinum group metal (PGM). In one embodiment, the first washcoat loading is at most 1.5 g/in$^3$ and the second washcoat loading is at least 3.0 g/in$^3$. The front washcoat portion and the rear washcoat portion together may overly substantially an entire axial length of the substrate.

In at least one embodiment, a TWC is provided. The TWC may include a substrate defining a plurality of channels; front and rear washcoat portions overlying the substrate and having respective first and second washcoat loadings, the first washcoat loading being at most 2.0 g/in$^3$ and less than the second washcoat loading; and the front washcoat portion including a catalyst material supported on a surface of a support material comprising at least 85 wt. % of a phosphate-containing material.

The phosphate-containing material may include one or more of $AlPO_4$, $ZrP_2O_7$, $CePO_4$, or $LaPO_4$. In one embodiment, at least 75 wt. % of the catalyst material in the front washcoat portion is supported on the surface of the phosphate-containing material. The first washcoat loading may be at most 1.5 g/in$^3$ and the second washcoat loading may be at least 3.0 g/in$^3$. The front washcoat portion may overly up to 15% of an axial length of the substrate. In one embodiment, the front washcoat portion includes a bottom washcoat layer contacting the substrate and including the catalyst material supported on the surface of the support material; and a top washcoat layer overlying the bottom washcoat layer and including a catalyst material supported on a support material comprising at least 85 wt. % of a cerium oxide. The bottom washcoat layer and the top washcoat layer may each have a washcoat loading of 0.2 to 1.0 g/in$^3$.

In at least one embodiment, a TWC is provided. The TWC may include a substrate defining a plurality of channels; a washcoat layer overlying up to 15% of an initial axial length of the substrate and having a washcoat loading of at most 2.0 g/in$^3$; and the washcoat layer including a catalyst material supported on a support material comprising at least 85 wt. % of a cerium oxide or at least 85 wt. % of a phosphate-containing material.

In one embodiment, the washcoat layer excludes alumina. The washcoat layer may be a top washcoat layer overlying one or more bottom washcoat layers and the one or more bottom washcoat layers may have a total washcoat loading of at least 3.0 g/in$^3$. In one embodiment, the support material comprises at least 95 wt. % of a cerium oxide or at least 95 wt. % of a phosphate-containing material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
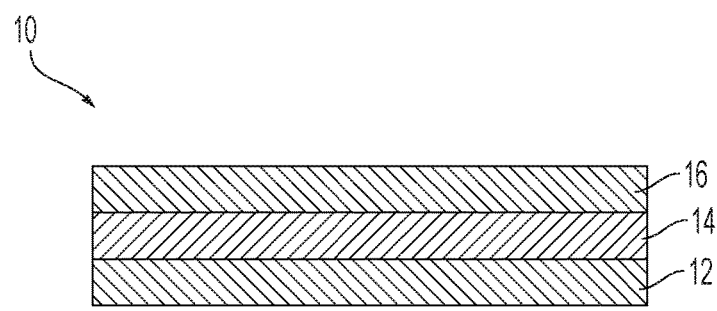
FIG. 1 is a schematic cross-section of a conventional three-way catalyst (TWC)

With reference to FIG. 1, a schematic cross-section of one wall of a typical three-way catalyst (TWC) 10 is shown. The TWC 10 generally includes a substrate 12 and one or more washcoat layers applied thereon. The substrate 12 may define a plurality of channels or openings through which the exhaust gas passes. For example, the substrate 12 may have a honeycomb type structure and may be formed as a cylinder or other elongated prism (sometimes referred to as a "brick"). The substrate 12 may be a monolith or extruded material, such as cordierite. In the example shown in FIG. 1, there is a first washcoat 14 applied over and contacting the substrate 12 and a second washcoat 16 applied over and contacting the first washcoat 14. However, the number of washcoats in a TWC may vary, for example, there may be only a single washcoat or there may be three or more washcoats.

The washcoats may include a support material, such as alumina (e.g., $Al_2O_3$), that is highly porous and has a large surface area. The support material may support precious metals, for example, platinum group metals (PGM), such as platinum, palladium, rhodium, or others. These precious metals may provide most or all of the catalytic activity in the washcoat. The washcoats may also include stabilizers, which may improve the thermal stability of the precious metals and/or support material in the washcoat. For example, the washcoat may include lanthanum, barium, yttrium, or other stabilizers. As shown in FIG. 1, in a typical TWC 10, the washcoat layers extend an entire length of the substrate and have a substantially uniform composition and structure throughout the TWC 10.

As described above, reducing the substrate thermal mass has been one approach to improving catalyst light-off. Another option to further reduce the thermal mass of a catalyst is to reduce the mass of the washcoat loaded onto the substrate, or decrease the washcoat loading. Catalyst light-off is generally triggered in the very front portion of the catalyst. Accordingly, the thermal mass may only be reduced in the very front portion of the TWC catalyst in order to maintain higher temperature emission control capability of the catalyst during transient vehicle operating environment. It has been found that, during vehicle operation, washcoat components may interact with phosphorus (P) compounds present in exhaust gas, usually derived from engine oil additives. Various phosphate species may be formed on the catalyst, including aluminum phosphate and cerium phosphate. It has been found that the highest concentration of these phosphorus compounds generally accumulates at the very front region of the catalyst, where light-off initiates. The formation of these phosphorus compounds can lead to catalyst activity degradation.

It has been discovered that the extent to which phosphorus negatively impacts the activity of a catalyst may depend on the washcoat loading of a conventional TWC. Reducing a catalyst's thermal mass by reducing its washcoat loading may therefore also decrease the phosphorus poison tolerance of the catalyst and consequently reduce its intrinsic activity. This greater loss in intrinsic activity can negate the benefit of reducing the thermal mass of the catalyst, since it takes a longer time for the catalyst to reach a higher active temperature. Reducing the thermal mass of the catalyst may provide improved emission control benefit only if the loss in the intrinsic activity of the catalyst during thermal-chemical aging, due to decreased washcoat loading, does not exceed the benefit of faster heat transfer rate to a lower heat capacity catalyst.

Accordingly, in at least one embodiment, non-conventional precious metal active washcoat materials combined with a unique catalyst washcoat structure are disclosed. The washcoat materials and structure may provide a phosphorus tolerant fast light-off catalyst. In order to minimize the negative impact of phosphorus poisoning on low thermal mass catalyst activity, a phosphorus tolerant, low thermal mass washcoat may be provided in the front zone of a catalyst. The active, yet phosphorus tolerant front zone may be combined with a conventional rear zone. Accordingly, the front zone may be both active (e.g., contributes to the conversion of hydrocarbons) and have a low thermal mass, even after continued exposure to phosphorus in the exhaust stream. The front zone may therefore not just act as an inactive phosphorus "trap" that increases thermal mass but does not contribute to catalytic activity.

Figure 2:
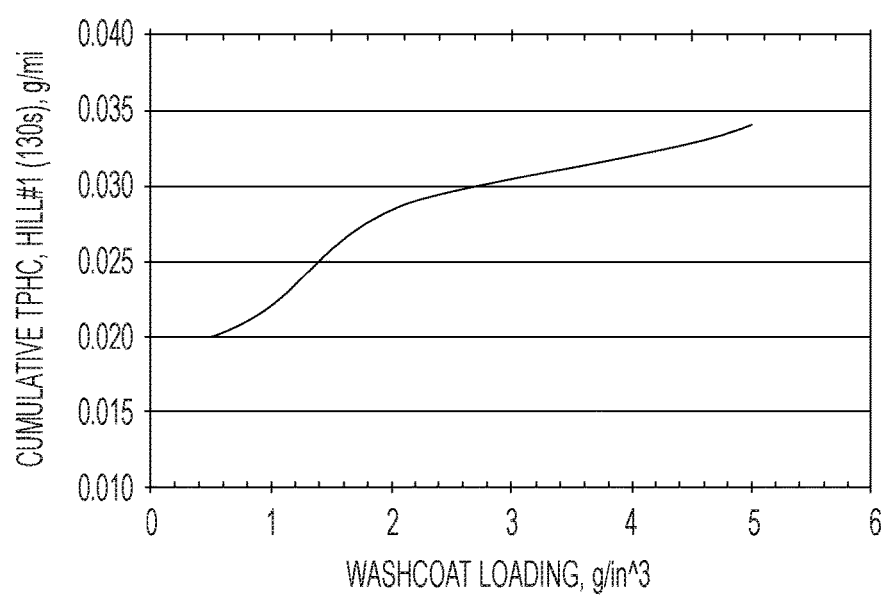
FIG. 2 is a simulated graph showing the theoretical impact of washcoat loading on hydrocarbon (HC) emissions.

With reference to FIG. 2, a computer model generated simulation is shown of the effect of decreasing washcoat loading in the front section of a catalyst on cumulative HC emissions in the first 130 seconds of a federal test procedure (FTP) cycle. As shown, a decrease in washcoat loading from 3.3 g/in³ to 1 g/in³ is predicted to result in a 30% decrease in tailpipe HC emissions in the first 130 seconds of an FTP cycle. The prediction assumes that the intrinsic activity of the catalyst is not affected by decreasing washcoat loading, however. The front zone of the catalyst, for example, ranging from 5% to 20% of total catalyst volume, is intended for initiating oxidation activity. Accordingly, this front zone does not have to contain all of the catalyst materials intended for control of emissions during highly transient air-fuel or space velocity perturbations. Here, the front zone of the catalyst may not be designed to provide OSC. Accordingly, the washcoat loading in the front zone of the catalyst can be reduced because it is designed specifically to provide fast CO, $H_2$, and HC oxidation capability when operated close to or just lean of stoichiometry during cold-start. The rear zone (e.g., the remainder) of the catalyst may maintain a conventional washcoat loading and composition, since it is intended for three-way catalyst function (e.g., HC and CO oxidation following light-off, during transient vehicle operating conditions, at higher space velocity, and for NOx control). The rear portion of the catalyst may also contain active OSC materials to handle the transient perturbations in air-fuel ratio as well as provide catalyst monitor capability.

Figure 3:
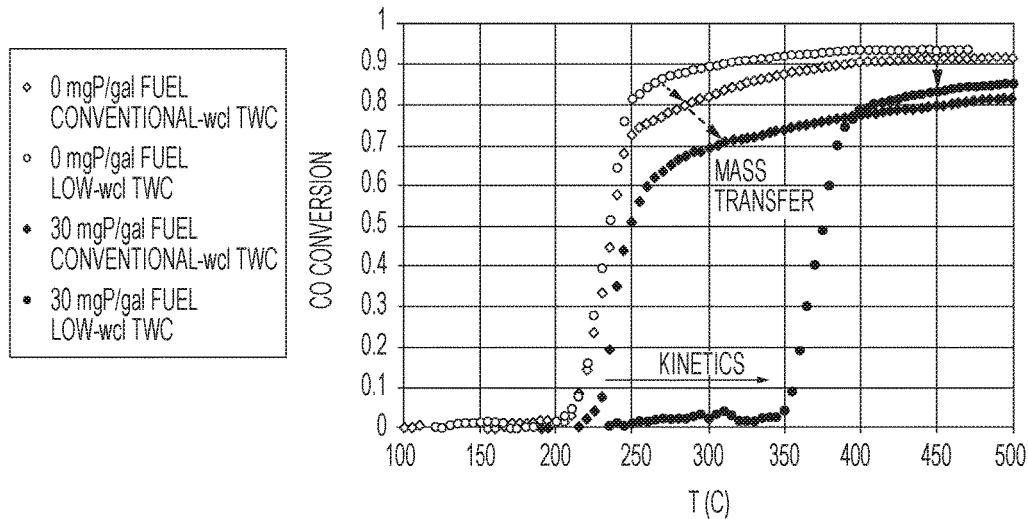
FIG. 3 is a graph of carbon monoxide conversion for a conventional TWC and a low washcoat loading TWC after thermal-only aging and thermal-chemical aging.
Figure 4:
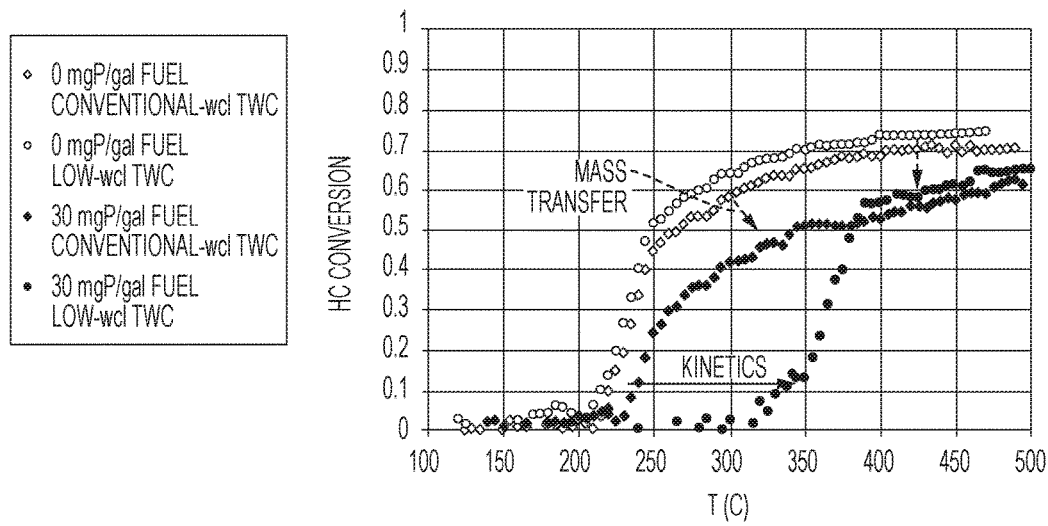
FIG. 4 is a graph of hydrocarbon conversion for a conventional TWC and a low washcoat loading TWC after thermal-only aging and thermal-chemical aging.

As described above, the example shown above assumed decreasing washcoat loading does not impact the rate or extent of catalyst degradation during full useful life (FUL) aging. However, it has been discovered that this is an incorrect assumption. With reference to FIGS. 3 and 4, laboratory aging was conducted on two fully-formulated (78 gcf Pd:2 gcf Rh) TWCs. The first sample had a conventional 3.3 g/in³ washcoat loading and the second sample had a low 1 g/in³ washcoat loading. Each sample was subjected to a 4-mode thermal-chemical or 4-mode thermal aging cycle using a pulsator. In brief, a pulsator is a reactor that combusts fuel in order to generate a vehicle simulated exhaust, which is used to perform accelerated aging and testing of catalyst samples. The accelerated aging cycle was run for 55 hours with catalyst temperatures ranging from 900° C. to 1000° C. during the various modes of the aging cycle. Fuel containing 30 mg P/gallon was used for the thermal-chemical aging in order to expose the catalyst to a 150,000-mile vehicle equivalent level of phosphorus. Each sample was also subject to a thermal-only aging cycle in order to differentiate between the impact of thermal and chemical degradation on catalyst activity.

As shown in FIGS. 3 and 4, there was a large negative impact of phosphorus on the activity of a low washcoat loaded catalyst compared to a conventional washcoat loaded catalyst. Each sample was supported on a cordierite monolith. A pulsator was used to test the CO and HC light-off activity of the front portion of each catalyst, following thermal or thermal-chemical aging. To further mimic cold-start light-off conditions, the tests were conducted at 320,000/hr space velocity in a net oxygen lean environment designed for fast CO and HC light-off. The light-off activity of the lower washcoat loaded sample is similar to, or better (from 250° C.) than that of the higher washcoat loaded sample following thermal-only aging. Without being held to any particular theory, it is believed that the improved activity of the low washcoat loaded sample starting at 250° C. may be due to faster pore diffusion, or mass transfer of the reactants to the active sites (precious metals) since it has thinner washcoat layers.

Following thermal-chemical aging (e.g., with simulated exhaust gases), both samples had decreased light-off activity performance than after thermal-only aging, due to phosphorus poisoning. However, the negative impact of phosphorus on the light-off initiation of the low washcoat loaded sample was significantly greater than that of the conventional washcoat loaded sample, as indicated by the ~100° C. shift in light-off temperature in the kinetic region. Both samples lost activity at high temperature due to phosphorus poisoning, as indicated by lower steady-state conversion efficiencies of the thermal-chemically aged samples (30 mgP/gal) compared to thermal-only aged samples (0 mgP/gal). Without being held to any particular theory, it is believed that this may be due, in part, to the reaction of phosphorus with catalyst material in a way that alters the pore structure of the washcoat, partially blocking or completely closing off active metal containing pores, resulting in a diffusion barrier that limits reactant access to active sites.

It is believed that phosphorus had a greater negative impact on the low wcl (washcoat load) sample because for a theoretically equivalent mass of P captured, the lower wcl sample had a greater depth of phosphorus penetration and a greater volume percentage of the sample was impacted. Accordingly, it has been found that simply reducing the washcoat loading of a catalyst to decrease thermal mass will not necessarily result in faster catalyst light-off.

Figure 5:
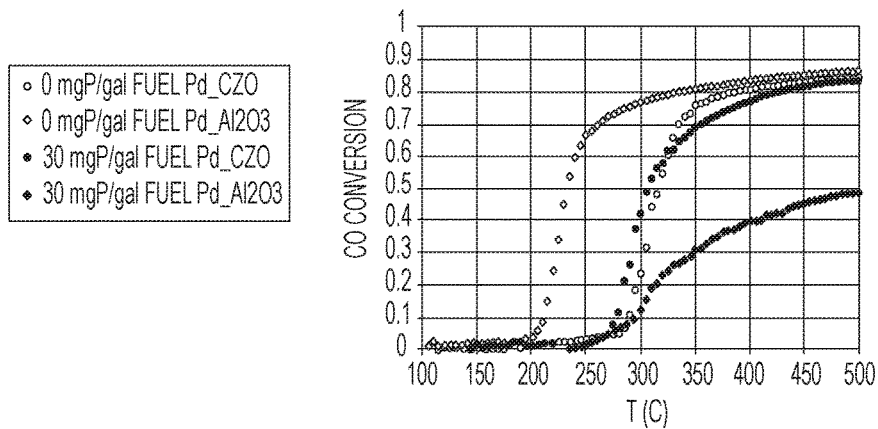
FIG. 5 is a graph of carbon monoxide conversion for a Pd supported on alumina TWC and a Pd supported on cerium zirconium oxide (CZO) after thermal-only aging and thermal-chemical aging.
Figure 6:
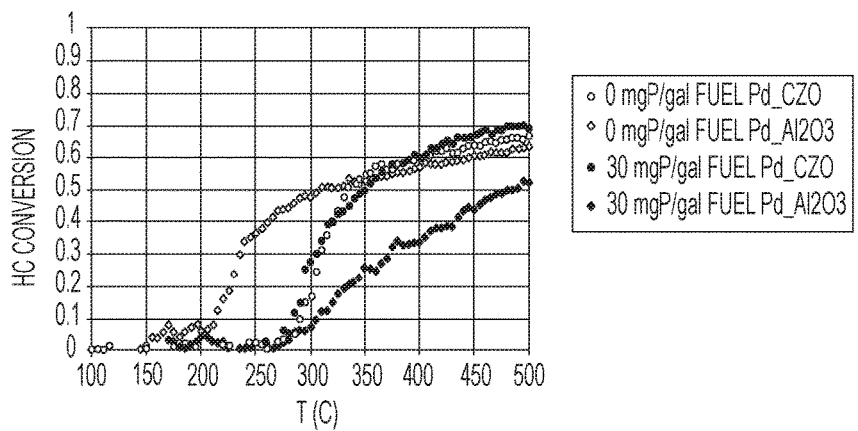
FIG. 6 is a graph of hydrocarbon conversion for a Pd supported on alumina TWC and a Pd supported on cerium zirconium oxide (CZO) after thermal-only aging and thermal-chemical aging.

With reference to FIGS. 5 and 6, the impact is shown of thermal versus thermal-chemical aging on CO and HC conversion efficiency of Pd supported on low wcl $Al_2O_3$ compared to Pd supported on low wcl CZO. Each sample had equivalent Pd loading (26 gcf) and equivalent washcoat loading (1 g/in³). Accordingly, both samples have a low washcoat loading compared to a conventional catalyst (e.g., 3 g/in³ or higher). The activity of the $Al_2O_3$ supported Pd was superior to that of the CZO supported Pd sample following thermal-only aging. This was not unexpected, since $Al_2O_3$ is the standard washcoat support material used in current TWCs. However, what was unexpected was that the CZO supported Pd sample retained much better activity than the $Al_2O_3$ supported Pd sample following thermal-chemical aging. This was surprising because $Al_2O_3$ retains a higher surface area and better activity than CZO after thermal aging. After thermal-chemical aging, where the support materials react with gas phase phosphorus, both supports suffer significant loss in surface area. However, it was discovered that the formation of $CePO_4$ is not as detrimental to catalyst activity as the formation of $AlPO_4$ during thermal-chemical aging.

Without being held to any particular theory, it is believed that this may be because the formation of $AlPO_4$ from $Al_2O_3$ results in a factor of 4 volume expansion of the support whereas the formation of $CePO_4$ leads to only a doubling of the initial $CeO_2$ volume. Therefore, a greater portion of the Pd may become inaccessible when supported on $Al_2O_3$, after aging with phosphorus. Since the front region of the catalyst may be the most susceptible to phosphorus poisoning, using a ceria-based material (e.g., $CeO_2$ or CZO) as an active metal support in the front portion of the catalyst may provide improved activity for light-off in this region. In addition to the convective heat transfer from the bulk gas flow, the reaction exotherm generated in the lighter front zone of the catalyst will help heat the heavier, back zone of the catalyst. For example, as the catalyst heats up and becomes active, exothermic chemical reactions may begin to occur, which generate more heat (e.g., heat of reaction). This heat may then be transferred to the flowing gases which then may accelerate the heat-up of the remaining volume of catalyst that is cooler than the exhaust gas. A conventional, heavier washcoat may be used to support or carry PGM in the remaining, or rear zone of the catalyst, since conventional washcoat materials at conventional loadings are more resistant to further thermal-chemical degradation than ceria-based materials alone. The rear zone of the catalyst may continue to further oxidize HC and CO and reduce NOx following light-off, during transient air-fuel and high space velocity operating environments.

Figure 7:
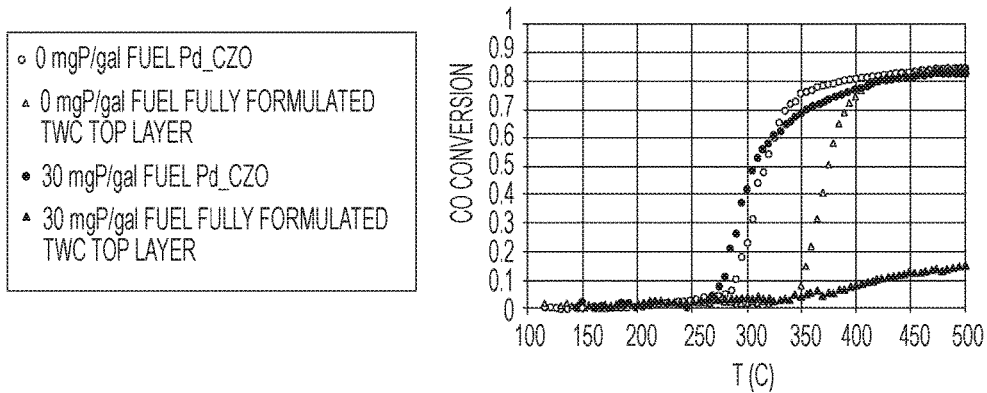
FIG. 7 is a graph of carbon monoxide conversion for a conventional top washcoat layer and a Pd supported on cerium zirconium oxide (CZO) after thermal-only aging and thermal-chemical aging.
Figure 8:
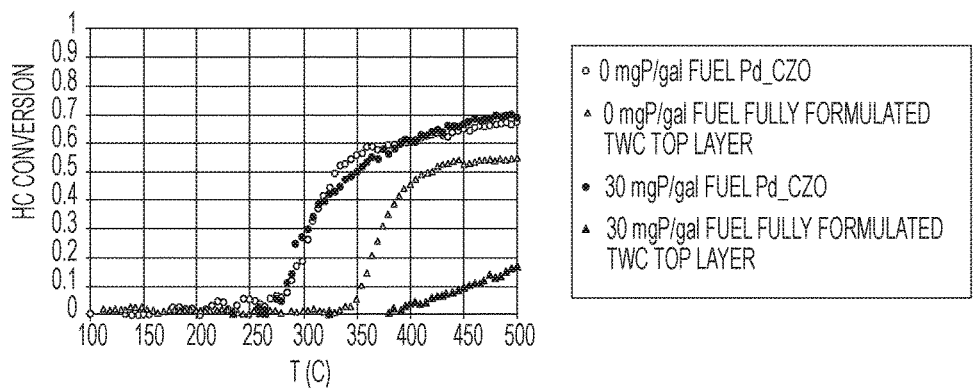
FIG. 8 is a graph of hydrocarbon conversion for a conventional top washcoat layer and a Pd supported on cerium zirconium oxide (CZO) after thermal-only aging and thermal-chemical aging.

With reference to FIGS. 7 and 8, a comparison is shown of the activity of Pd supported on low wcl CZO to a lower-loaded Rh supported on a conventional fully-formulated TWC top washcoat layer, following thermal or thermal-chemical aging. Conventional TWCs may have multiple layers, including a top (closest to bulk gas) Rh-containing layer. However, if this top layer reacts with phosphorus in the front zone of the catalyst, it may become inactive and it may also form a diffusion barrier to the layer(s) of catalyst beneath it. As shown in FIGS. 7 and 8, Pd supported on CZO remained active after thermal-chemical aging and showed significantly better HC and CO conversion activity than the conventional, lower-loaded Rh containing top washcoat layer, especially after thermal-chemical aging. Therefore, it has been discovered that a conventional TWC top layer may not necessarily help the activity of the front zone of the catalyst, even though it is adding to its thermal mass.

Figure 9:
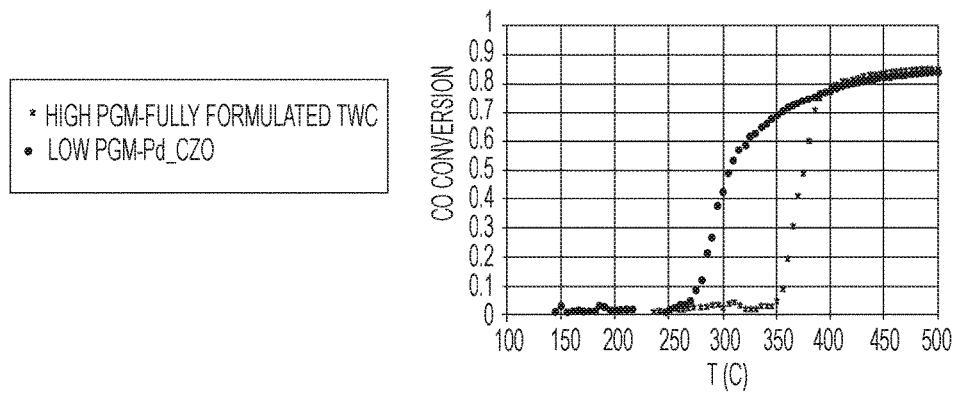
FIG. 9 is a graph of carbon monoxide conversion for a fully formulated, high platinum group metal (PGM) loaded, low washcoat loaded TWC and a low washcoat loaded Pd supported on cerium zirconium oxide (CZO) after thermal-chemical aging.
Figure 10:
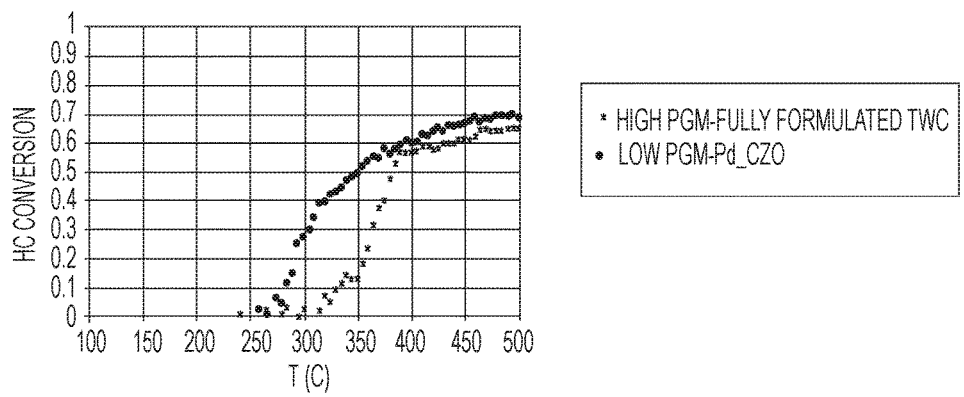
FIG. 10 is a graph of hydrocarbon conversion for a fully formulated, high platinum group metal (PGM) loaded, low washcoat loaded TWC and a low washcoat loaded Pd supported on cerium zirconium oxide (CZO) after thermal-chemical aging.

With reference to FIGS. 9 and 10, the performance of two low washcoat load samples following thermal-chemical aging is compared. The two samples included a fully-formulated 1 g/in$^3$ 78 gcf Pd:2 gcf Rh sample, including alumina, and a 1 g/in$^3$ 26 gcf Pd CZO sample. As shown, the low PGM Pd CZO-supported sample showed better activity than the higher PGM, fully formulated TWC. As described above, it would have been expected that a TWC having a higher loading of precious metals would have improved performance compared to a lower loaded TWC. However, the impact of the phosphorus on the reduced thermal mass of the samples is not the same, resulting in the lower PGM CZO-supported sample having a surprisingly superior activity.

Figure 11:
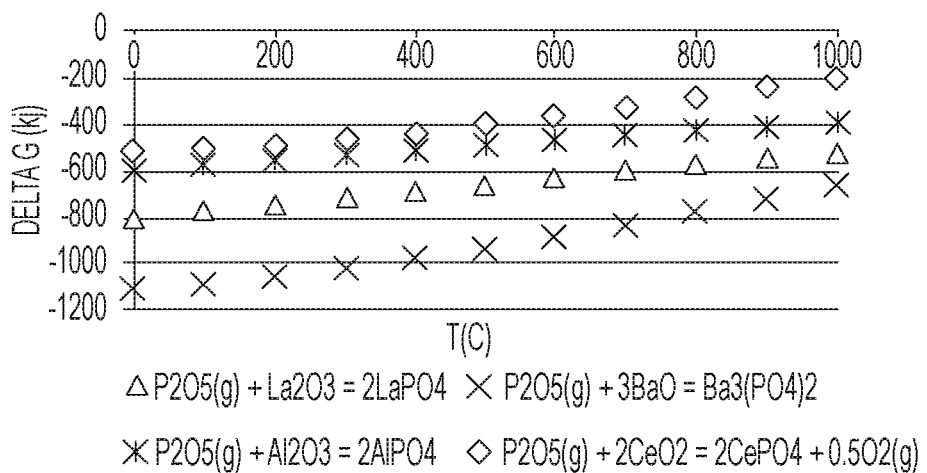
FIG. 11 is a graph of the free energy change associated with several washcoat materials reacting with phosphorus.

With reference to FIG. 11, a graph of Gibb's free energy is shown for the reaction of several washcoat materials. As shown, the reaction of phosphorus with many TWC washcoat components is thermodynamically favorable (negative delta G or Gibb's free energy). Since most or all of the TWC components, including $Al_2O_3$ and $CeO_2$, will react with phosphorus, it is not predictable which washcoat component would be a more phosphorus tolerant support or stabilizer for PGM from this data.

Figure 12:
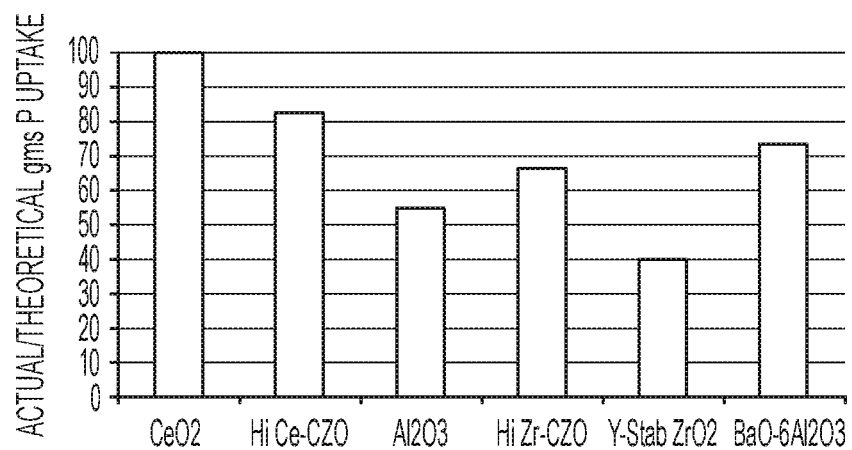
FIG. 12 is a graph showing the phosphorus uptake of several washcoat materials.
Figure 13:
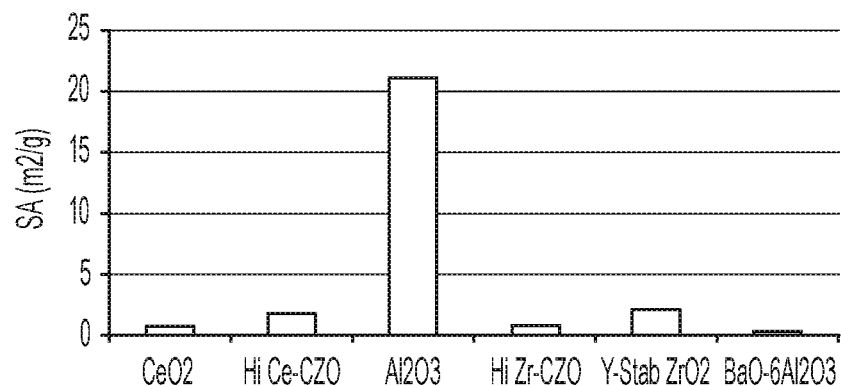
FIG. 13 is a graph showing the surface area of several washcoat materials.
Figure 14:
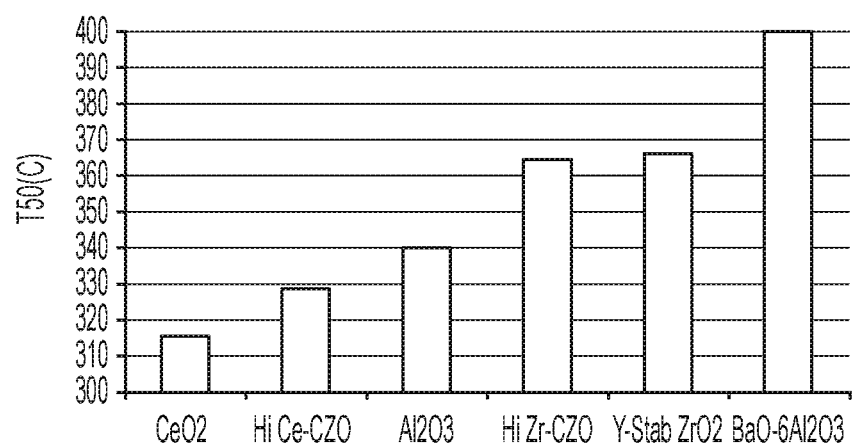
FIG. 14 is a graph showing the T50 temperature of the washcoat materials in FIGS. 12 and 13.

With reference to FIGS. 12-14, additional data is shown that makes it even harder to predict that cerium-based materials (e.g., $CeO_2$ or CZO) would make an effective phosphorus tolerant support material. With reference to FIG. 12, the reactivity of phosphorus with various PGM carrier materials was tested in powder form (without cordierite substrate). First, each material was impregnated with an equivalent loading of Pd to enable testing of the intrinsic activity of the catalyst after exposure to phosphorus. Next, the samples were impregnated with phosphorus via incipient wetness with a 33 wt % solution of ammonium phosphate, followed by calcination at 600° C. for 1 h. After phosphorus impregnation, the samples were hydrothermally aged at 900° C. for 100 hours to completely react the phosphorus with the washcoat materials, as well as to accelerate the thermal degradation of the phosphorus poisoned catalysts.

X-ray fluorescence (XRF) was used to measure the mass of reacted phosphorus relative to the mass of phosphorus that could have theoretically reacted with the material. As shown in FIG. 12, $CeO_2$ had the highest phosphorus uptake, followed by high-Ce CZO. Alumina, however, had relatively low uptake, particularly compared to $CeO_2$. With reference to FIG. 13, the BET surface area of each catalyst was measured after phosphorus poisoning and hydrothermal aging. As shown, $CeO_2$ had a very low surface area, as did high-Ce CZO and high-Zr CZO. In contrast, alumina had a very high surface area. The catalysts were then evaluated for HC conversion activity as a function of temperature. FIG. 14 summarizes the T50 HC (temperature at which 50% of the feedgas hydrocarbons are converted) results, where lower T50 values are indicative of a more active catalyst.

As shown, $CeO_2$ had the best (lowest) T50 temperature of the samples tested, followed by high-Ce CZO. The superior performance of Pd supported on $CeO_2$ and high-Ce CZO following phosphorus impregnation and hydro-thermal aging was unexpected, since $CeO_2$ and high-Ce CZO reacted with closest to the stoichiometric amount of phosphorus (high P uptake) and both had very low surface area compared to $Al_2O_3$. Based on FIGS. 12 and 13, one of ordinary skill in the art would expect alumina to have the best P tolerance, since less phosphorus is reacted with alumina and alumina has by far the largest surface area. High surface area is generally associated with good catalytic activity, since it provides the exhaust gas with more access to the PGM.

However, this data demonstrates that cerium-based materials actually have a superior phosphorus tolerance despite their high P uptake and low surface area. As described above, it is believed that this may be due to the factor of 4 volume expansion during the formation of $AlPO_4$ from $Al_2O_3$, whereas the formation of $CePO_4$ leads to only a doubling of the initial $CeO_2$ volume. Therefore, a greater portion of the Pd may become inaccessible when supported on $Al_2O_3$, after aging with phosphorus. Accordingly, it has been discovered that P tolerant, catalytically active, low loading (e.g., ≤2 g/in$^3$) washcoat front regions may be formed using cerium-based support materials, such as $CeO_2$ or CZO. Alumina, the standard support material, may be eliminated completely from the front zone or reduced to a small or minimal amount (e.g., ≤5 wt. %).

It has also been discovered that pre-phosphated materials may provide a phosphorus tolerant or resistant support materials for a TWC. In one embodiment, "pre-phosphated" may refer to a catalyst support material reacted with phosphorus (e.g., a stoichiometric amount of phosphorus) prior PGM deposition. By using a material that already includes phosphorus, the support material may react less, or not at all, with the phosphorus in the exhaust gases. To test this approach, a sample of $AlPO_4$ was made via sol gel synthesis and tested as a phosphorus poison resistant Pd support. The synthesis process involved the following four steps: 1. hydrolysis of aluminum alkoxides, 2. peptization of the hydroxide, 3. gel formation, 4. calcination to alumina. Aluminum isopropoxide (AIP) of known weight was dissolved and reacted vigorously while stirred in hot deionized water maintained at 85 to 95° C. Hydrolysis was carried out between excess water and the alkoxide at a molar ratio of 100. The solution contained in a glass beaker was heated and stirred on a magnetic heating plate for 2 hours. The opening of the beaker was covered by aluminum foil to eliminate significant loss of water vapor. The entire process was carried out in a fume hood to vent evolving solvent vapor. This solution was allowed to react at 85 to 95° C. overnight for 20 hours. The amount of acid implemented corresponded to 1 mole of acid per mole of alkoxide (e.g., 1 mole $H_3PO_4$ per mole of AIP). After 20 hours of heating and stirring, the removal of the aluminum foil allowed the temperature of the alumina sol solution to drop to about 55° C. Following a drying of the alumina gel at 110° C. for 24 hours, the sample was sieved. Finally, calcining the dried gel in ambient air at 600° C. for 16 hours yielded the finished catalyst.

Figure 15:
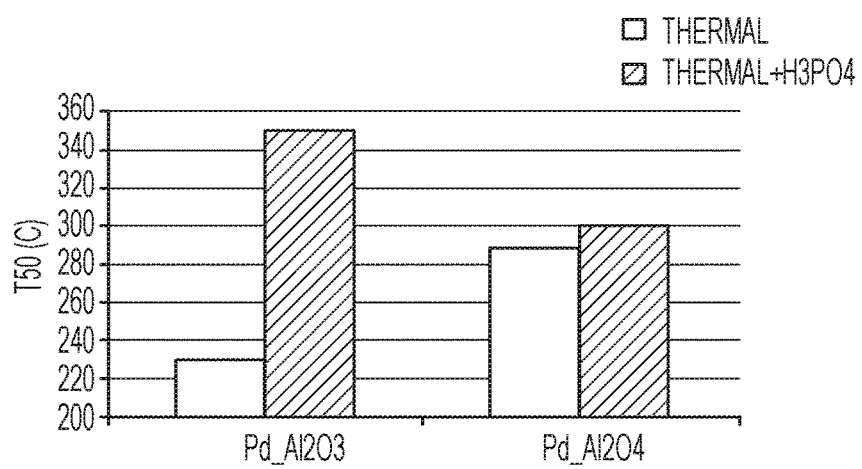
FIG. 15 is a graph showing the T50 temperatures for Pd supported on alumina and Pd supported on $AlPO_4$ after thermal-only and thermal-chemical aging.

Powder samples of $Al_2O_3$ and $AlPO_4$ were impregnated with equivalent amounts of Pd and evaluated for light-off activity following thermal or thermal-chemical aging using a fluidized bed reactor. For thermal-chemical aging, a solution of phosphoric acid and water was vaporized and passed across the samples using a carrier $N_2$ gas at 900° C. for 16 hours. Following thermal-chemical aging, 14 wt. % P (from XRF analysis) had reacted with the $Al_2O_3$ sample whereas no additional P was observed to react with the stoichiometric $AlPO_4$ sample. Thermal aging was conducted similarly except phosphoric acid was not added to the gas mixture. The results following aging are shown in FIG. 15. The $AlPO_4$ support was minimally impacted by phosphorus during aging, whereas the $Al_2O_3$ support's activity decreased significantly when phosphorus was present in the aging gas stream. Accordingly, while the alumina had an initial T50 that was significantly lower than the aluminum phosphate, the alumina performance decreased substantially under simulated operating conditions. In contrast, while the aluminum phosphate did not have an excellent T50 to start with, it maintained virtually all of its performance during the thermal-chemical aging and was much more effective than the alumina under operating conditions.

Figure 16:
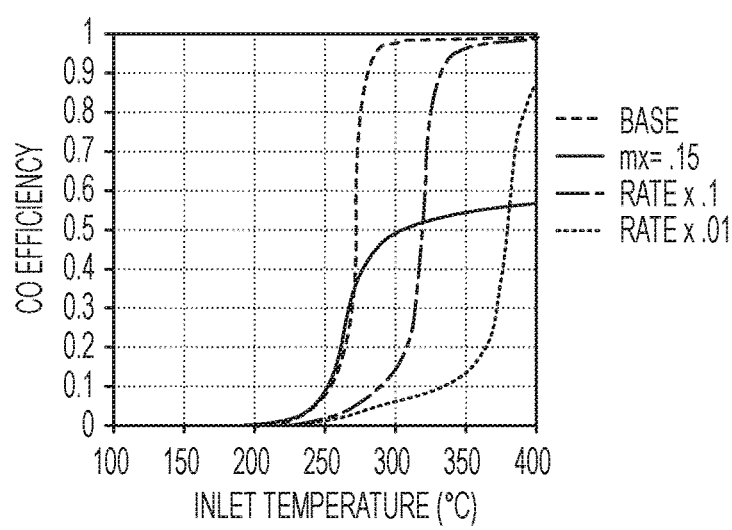
FIG. 16 is a simulated graph showing the impact of a change in kinetics or a change in mass transfer on the carbon monoxide conversion efficiency of a TWC.
Figure 17:
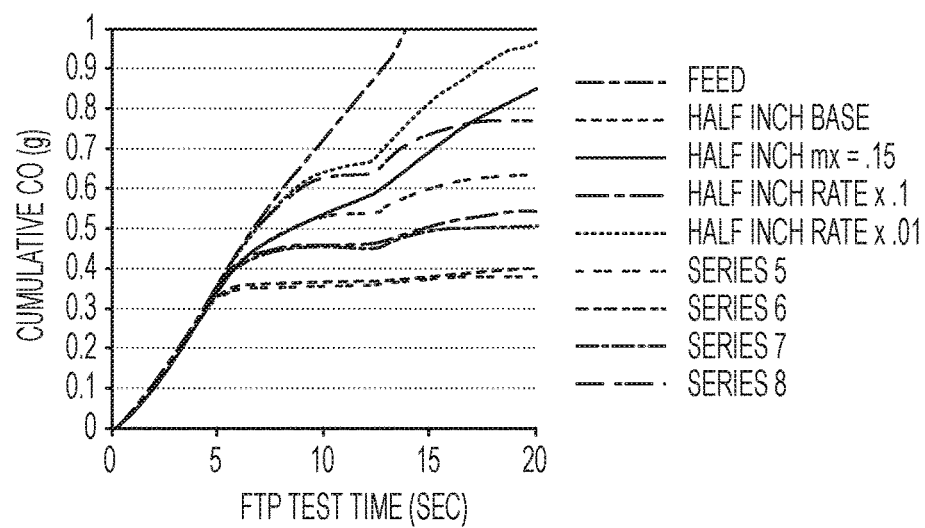
FIG. 17 is a simulated graph showing the predicted carbon monoxide emissions based on the changes shown in FIG. 16.

Catalyst performance includes at least two parameters: kinetics and mass transfer. Adjusting the composition and structure of the catalyst may affect one parameter in a positive manner and another in a negative manner. In order to achieve overall improved performance, a balance between a decrease in TWC thermal mass via washcoat reduction and the decrease in thermal-chemical durability of the TWC due to decreased washcoat loading may be beneficial. FIGS. 16 and 17 show the modeled impact of a shift in low temperature kinetic activity versus high temperature mass transfer limited activity, across the front 0.5 inch zone of a catalyst, on predicted cumulative CO emissions during cold-start. There is a baseline representing the light-off performance and corresponding simulated cumulative emissions of a baseline catalyst.

A second line shows the impact of decreasing kinetic activity (e.g., higher light-off temperature), compared to baseline, with no change in mass transfer limits, on catalyst CO conversion capability. A third line shows the impact of increasing the mass transfer limitation while maintaining the kinetic activity of a catalyst on its CO conversion capability. A fourth line shows activity of a severely kinetically shifted catalyst. FIG. 17 summarizes the emissions from both the front ½-inch zone of a catalyst (solid lines) as well as the front ½-inch zone combined with the rear 2.5-inch remaining catalyst (dashed lines). For equivalent washcoat loading, a 50° C. shift in CO light-off to higher temperature results in better cumulative CO emissions than a 45% decrease in mass transfer limited CO conversion, at high temperature. Accordingly, maintaining accessibility of reactants to active catalyst components at high temperature may be more useful for emissions reduction than the low temperature activity of the catalyst, up to a limited shift in kinetic activity (fourth line).

With reference to FIGS. 18-23, several embodiments of phosphorus tolerant or resistant three-way catalysts (TWCs) 20 are shown. In at least some of the embodiments, the thermal mass of the TWC 20 is also reduced compared to a conventional TWC, thereby improving the light-off temperature of the catalyst. Each of the TWCs 20 may include a substrate 22. The substrate 22 may define a plurality of channels or openings through which the exhaust gas passes. For example, the substrate 22 may have a honeycomb type structure and may be formed as a cylinder or other elongated prism (sometimes referred to as a "brick"). The substrate 22 may be a monolith or extruded material, such as cordierite.

The TWC 20 may include a front portion or zone 24 and a rear portion or zone 26 disposed on and/or contacting the substrate 22. In at least one embodiment, the front and rear portions may comprise an entire length of the TWC 20. The front and rear portions may each include one or more washcoats. In one embodiment, the front portion 24 and its underlying substrate 22 may comprise up to 25 vol. % of the TWC 20, for example, up to 20 vol. %, 15 vol. %, or 10 vol. %. In another embodiment, the front portion 24 and its underlying substrate 22 may comprise at least 1 vol. % of the TWC 20, for example, at least 3 vol. %, 5 vol. %, or 10 vol. %. In another embodiment, the front portion 24 and its underlying substrate 22 may comprise 1 to 25 vol. % of the TWC 20, or any sub-range therein, such as 3 to 25 vol. %, 5 to 25 vol. %, 5 to 20 vol. %, 3 to 15 vol. %, 5 to 15 vol. %, 3 to 10 vol. %, 5 to 10 vol. %, 2 to 8 vol. %, or others. Instead of total volume percent, the above maximums, minimums, and ranges may also apply to a percentage of an axial length of the TWC 20. For example, the front portion may comprise 1 to 25 percent, or any sub-range therein, of the length of the TWC 20, etc. The front portion 24 may refer to an initial portion in the axial direction of the TWC 20. The front portion 24 may correspond to the upstream portion of the TWC 20, e.g., the portion that is configured to first receive exhaust gases from an engine. The front portion 24 may extend from the very front/initial axial surface of the TWC 20 towards the rear of the TWC 20.

In at least one embodiment, the rear portion 26 may include the balance of the washcoat(s) that are not included in the front portion 24. In one embodiment, the rear portion 26 may include a conventional washcoat or washcoats. For example, the rear portion 26 may include a single washcoat layer 28, as shown, or multiple washcoats (e.g., two or more), such as described above with respect to washcoat layers 14 and 16. If there are multiple washcoats in the rear portion 26, they may be stacked one on top of the other. In at least one embodiment, the rear portion 26 has a washcoat loading of at least 3.0 $g/in^3$. Accordingly, the rear portion 26 may be considered a fully formulated TWC having a conventional or typical thermal mass.

In at least one embodiment, the front portion 24 may have a lower thermal mass or washcoat loading than the rear portion 26. In one embodiment, the front portion 24 may have a washcoat loading of at most 2.0 $g/in^3$. In another embodiment, the front portion 24 may have a washcoat loading of at most 1.5 $g/in^3$ or 1.0 $g/in^3$. For example, the front portion 24 may have a washcoat loading of 0.3 to 2.0 $g/in^3$, 0.5 to 2.0 $g/in^3$, 1.0 to 2.0 $g/in^3$, 0.5 to 1.5 $g/in^3$, or 0.75 to 1.25 $g/in^3$. Accordingly, the front portion 24 may be considered to have a low washcoat load, which may improve catalyst light-off temperatures (e.g., allow the front portion to heat up faster and begin converting HCs sooner).

Figure 18:
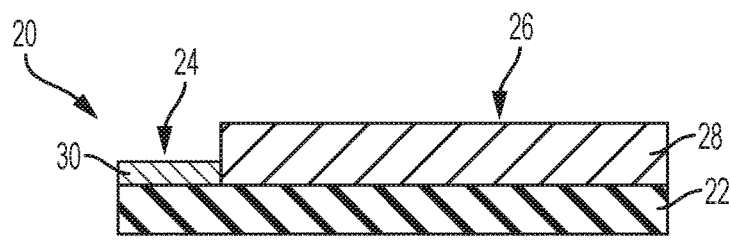
FIG. 18 is an example of a TWC including a front portion having a phosphorus tolerant cerium oxide-based support material.

With reference to FIG. 18, the front portion 24 may include a washcoat layer 30. The washcoat layer 30 may include a cerium-based support material. The cerium-based support material may include a cerium oxide, such as $CeO_2$ or CZO. In one embodiment, the support material may include at least 75 wt. % cerium oxide (e.g., $CeO_2$ or CZO), such as at least 85 wt. %, 90 wt. %, 95 wt. %, 99 wt. % cerium oxide. In another embodiment, the support material may include 100 wt. % cerium oxide. In addition to the support material, the washcoat layer 30 may include a catalytic material, such as one or more platinum group metals (PGMs). The washcoat layer 30 may also include stabilizing elements or materials, such as lanthanum, barium, yttrium, or other stabilizers. For purposes of this application, these elements/materials may be considered separate from the support material.

In at least one embodiment the support material in the washcoat layer 30 (and/or the washcoat layer 30 in general) may include little to no alumina ($Al_2O_3$). For example, the support material and/or washcoat layer 30 may include less than 25 wt. %, 20 wt. %, 15 wt. %, 10 wt. %, or 5 wt. % alumina. In another embodiment, the support material and/or washcoat layer 30 may include no, or substantially no (e.g., ≤1 wt. %), alumina. As described above, it has been discovered that while alumina is a highly effective support material under thermal-only conditions, its performance is significantly reduced when phosphorus poisoning occurs. It was also surprisingly discovered that cerium oxides, such as $CeO_2$ or CZO, which may sometimes be included in relatively low amounts as an oxygen storage material, are effective as phosphorus tolerant support materials.

Accordingly, the front portion 24 may include a washcoat layer 30 that includes primarily cerium oxide as a support material. The front portion 24 may include little or no alumina. The cerium oxide may include one or more of ceria ($CeO_2$) and a mixed oxide, such as a cerium zirconium oxide (CZO). The relative cerium and zirconium content of CZO may vary. As demonstrated above, high-Ce CZO (e.g., Ce>Zr) may perform more similar to ceria than high-Zr CZO (e.g., Zr>Ce). However, either form of CZO may be used as a support material in the washcoat layer 30.

The washcoat layer 30 may include one or more catalytic materials, such as PGMs. The PGMs may be dispersed on and supported by the support material (e.g., cerium oxide). The washcoat layer 30 may have a PGM loading sufficient to have appreciable catalytic activity (e.g., conversion of HCs). In one embodiment, the washcoat layer 30 may include a PGM loading of at least 25 grams per cubic foot (gcf), for example, at least 50, 100, 150, or 200 gcf. In another embodiment, the washcoat layer 30 may include a PGM loading of 20 to 300 gcf, or any sub-range therein, such as 25 to 250 gcf, 25 to 200 gcf, 50 to 200 gcf, 25 to 150 gcf, 25 to 100 gcf, or 50 to 150 gcf. In one embodiment, the PGM may include palladium, platinum, and/or rhodium. In another embodiment, the PGM loading may include at least 50 wt. % Pd, for example, at least 75 wt. %, 85 wt. %, or 95 wt. %. In one embodiment, the PGM loading is completely, or substantially completely (e.g., at least 99 wt. %) palladium.

Accordingly, the washcoat layer 30 may be a low thermal mass washcoat layer that maintains a high level of catalytic activity even when exposed to phosphorus. The phosphorus tolerant washcoat layer 30 may include a cerium oxide as the primary support material. The washcoat layer 30 may include a plurality of PGM particles dispersed on the support material. In one embodiment, the PGM may be primarily palladium. The cerium oxide may react with the phosphorus in the exhaust gases, however, it is believed that the activity is maintained due to the relatively low volume expansion from cerium oxide to cerium phosphate (e.g., $CePO_4$). This relatively low volume expansion may allow the exhaust gases to still access the PGM particles dispersed on the support material, thereby maintaining activity.

Figure 19:
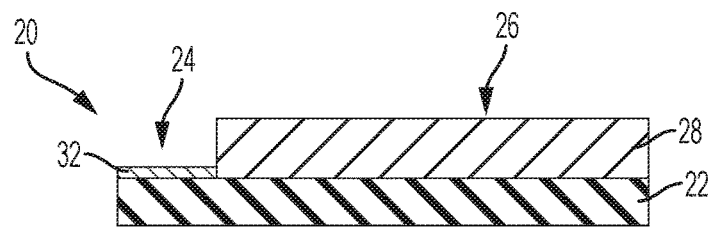
FIG. 19 is an example of a TWC including a front portion having a phosphorus resistant pre-phosphated support material.

With reference to FIG. 19, a TWC 20 is provided in which the front portion 24 may include a washcoat layer 32. The rest of the TWC 20, such as the substrate 22 and the rear portion 26 may be substantially the same as the TWC 20 shown and described with respect to FIG. 18. In at least one embodiment, the washcoat layer 32 may include a pre-phosphated support material. As used herein, the term "pre-phosphated" may refer to a material that includes phosphates prior to exposure to exhaust gases. The pre-phosphated support materials may include known support or OSC materials that have been reacted with phosphorus, such as alumina or ceria/CZO. The materials may also include other materials or oxides reacted with phosphorus, such as zirconium oxides or lanthanum oxides. Non-limiting examples of pre-phosphated materials may include $AlPO_4$, $ZrP_2O_7$, $CePO_4$, $LaPO_4$, or others.

As described above, pre-phosphated materials may not further react (or may have minimal reaction) with phosphorus when exposed to it in an exhaust stream. Accordingly, using a pre-phosphated material as a support material in the front portion 24 of a TWC may result in a catalyst that maintains good activity in the front portion after thermal-chemical aging. In one embodiment, the support material may include at least 75 wt. % pre-phosphated material (e.g., $AlPO_4$, $ZrP_2O_7$, $CePO_4$, $LaPO_4$), such as at least 85 wt. %, 90 wt. %, 95 wt. %, 99 wt. % pre-phosphated material. In another embodiment, the support material may include 100 wt. % pre-phosphated material.

The washcoat layer 32 may include one or more catalytic materials, such as PGMs. The PGMs may be dispersed on and supported by the support material (e.g., pre-phosphated material). The washcoat layer 32 may have a PGM loading sufficient to have appreciable catalytic activity (e.g., conversion of HCs). In one embodiment, the washcoat layer 30 may include a PGM loading of at least 25 grams per cubic foot (gcf), for example, at least 50, 100, 150, or 200 gcf. In another embodiment, the washcoat layer 30 may include a PGM loading of 20 to 300 gcf, or any sub-range therein, such as 25 to 250 gcf, 25 to 200 gcf, 50 to 200 gcf, 25 to 150 gcf, 25 to 100 gcf, or 50 to 150 gcf. In one embodiment, the PGM may include palladium, platinum, and/or rhodium. In another embodiment, the PGM loading may include at least 50 wt. % Pd, for example, at least 75 wt. %, 85 wt. %, or 95 wt. %. In one embodiment, the PGM loading is completely, or substantially completely (e.g., at least 99 wt. %) palladium.

The PGMs may be dispersed on a surface of the pre-phosphated support material. Accordingly, the structure of the washcoat layer 32 may differ from that of a washcoat layer in which a support material reacts with phosphorus in an exhaust stream during operation of an engine. In the latter case, the support material will react with the phosphorus to form a phosphate, during which there will be a volume expansion. For example, as described above, alumina reacts with phosphorus to form $AlPO_4$. The formation of $AlPO_4$ has about a four-fold volume expansion associated therewith. During the expansion, PGM particles become encapsulated in the $AlPO_4$ and are no longer at the surface of the support material. As described above, it is believed that this encapsulation and reduced access to exhaust gases is a significant factor in the reduced catalytic activity of alumina and other support materials.

In contrast, in the disclosed pre-phosphated support materials, the PGMs may be disposed on the surface of the support material at the onset. For example, at least 75 wt. %, 85 wt. %, or 95 wt. % of the PGM particles may be disposed on the surface of the support material and accessible to the exhaust gases. In another embodiment, all, or substantially all (e.g., at least 99 wt. %), of the PGM particles may be disposed on the surface of the support material and accessible to the exhaust gases. Therefore, the PGMs are accessible to the exhaust gases and are able to provide catalytic activity. Since the pre-phosphated support material does not react, or reacts very little, with additional phosphorus from the exhaust stream, the PGMs may remain on the surface of the support material even after thermal-chemical aging.

Since the phosphorus may not react with the pre-phosphated support material in the front portion 24, it may travel downstream and may react with the washcoat(s) in the rear portion 26. However, as described above, the rear portion 26 may be better able to accept the phosphorus and still maintain its intended functions (e.g., oxygen storage, NOx conversion, etc.). For example, if the rear portion 26 has a conventional thermal mass, such as 3.0 g/in$^3$ or greater, the phosphorus may have less impact on the washcoat. Another benefit of the pre-phosphated support material is that, since it does not react with the phosphorus in the exhaust stream, there is little or no additional thermal mass generated in the front portion 24. This may help to maintain a low light-off temperature of the catalyst in the front portion 24. In contrast, a conventional support material may react with the phosphorus and increase the thermal mass of the front portion. Accordingly, even an initially low thermal mass front portion (e.g., of alumina) may gain thermal mass during thermal-chemical aging and may have an increased light-off temperature as more phosphates form in operation.

Figure 20:
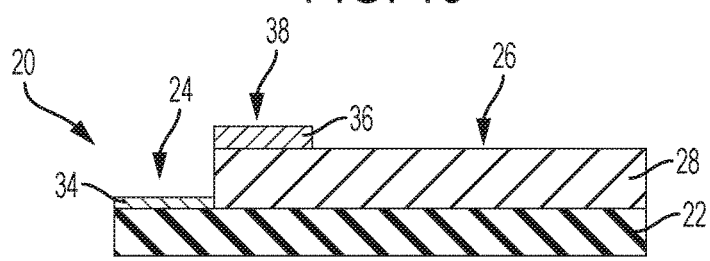
FIG. 20 is an example of a TWC including a front portion having a phosphorus resistant pre-phosphated support material and a middle portion having a phosphorus tolerant cerium oxide-based support material.

With reference to FIG. 20, a TWC 20 is provided. The TWC 20 may include a front portion 24 having a washcoat layer 34. The washcoat 34 may be a pre-phosphated washcoat similar to washcoat layer 32, shown in FIG. 19. The rest of the TWC 20, such as the substrate 22 and the rear portion 26 may be substantially the same as the TWC 20 shown and described with respect to FIG. 18, except that an additional washcoat layer 36 may be provided on or over the rear portion 26. The washcoat layer 36 may be disposed at a front or initial zone or portion of the rear portion 26. For example, the washcoat layer 36 may be adjacent or directly adjacent to the front portion 24. In one embodiment, the portion of the TWC 20 in which the washcoat layer 36 overlies the rear portion 26 may be referred to as the middle portion 38.

In at least one embodiment, the washcoat layer 36 may be the same or substantially the same as the washcoat layer 30 described above with reference to FIG. 18. Accordingly, the TWC 20 in FIG. 20 may include a front portion 24 having a washcoat layer 34 including a pre-phosphated support material and a middle portion 38 having a washcoat layer 36 including a cerium oxide support material. This catalyst configuration may combine several of the benefits of each type of washcoat. As described above, the pre-phosphated washcoat may have little or no reaction with the phosphorus in the exhaust gases, thereby maintaining a low thermal mass (e.g., <2.0 g/in$_3$) and a high activity level in the front portion. The washcoat layer 36 may react with the phosphorus that would normally have reacted with the front portion, thereby protecting the washcoat layer(s) of the rear portion 26 from phosphorus poisoning. While the washcoat layer 36 may add thermal mass to the TWC 20 as a whole, it does not affect the thermal mass of the front portion 24, thereby allowing it to maintain a fast light-off.

Figure 21:
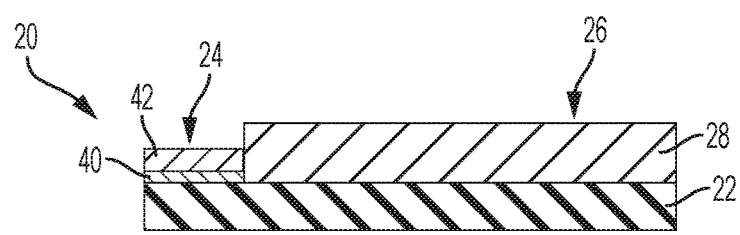
FIG. 21 is an example of a TWC including a front portion having a phosphorus resistant pre-phosphated support material and a phosphorus tolerant cerium oxide-based support material.

With reference to FIG. 21, a TWC 20 is provided. The TWC 20 may include a front portion 24 having a washcoat layer 40 overlying or contacting the substrate and a washcoat layer 42 overlying or contacting the washcoat layer 40. The washcoat 40 may be a pre-phosphated washcoat similar to washcoat layer 32, shown in FIG. 19. However, the washcoat layer 40 may also include support materials that are less P tolerant, such as alumina. The washcoat layer 42 may be a cerium oxide-based washcoat similar to washcoat layer 30, shown in FIG. 18. The rest of the TWC 20, such as the substrate 22 and the rear portion 26 may be substantially the same as the TWC 20 shown and described with respect to FIG. 18.

Accordingly, the washcoat layer 42 may act as a sort of shield or barrier to the washcoat layer 40. As described above, alumina is a highly effective support material prior to being exposed to poisons, such as phosphorus. By providing a P tolerant layer above the washcoat layer 40, alumina in the washcoat layer 40 may be protected from the phosphorus and allowed to operate in a pristine or more pristine state. Exhaust gases may first contact the washcoat layer 42, which may include cerium oxide. The cerium oxide may react with the phosphorus, yet the PGMs dispersed on the cerium oxide may still be accessible and remain active. Therefore, a bi-layer front portion 24 may allow the use of some support materials that would normally not be P tolerant. The thermal mass of each washcoat layer 40, 42 may be the same or similar as described above. In another embodiment, the total thermal mass of the layers 40 and 42 may be the same or similar to the ranges described above for each layer (e.g., ≤2 g/in$^3$). In another embodiment, each layer 40 or 42 may have a thermal mass of 0.2 to 1.0 g/in$^3$, or any sub-range therein, such as 0.3 to 0.8 g/in$^3$ or 0.3 to 0.6 g/in$^3$. Accordingly, the bi-layer front portion 24 may still be a low thermal mass region compared to the rear portion 26 of the TWC 20. While two layers are shown in the front portion 24, there may be three or more layers including any combination of the different compositions or structure described above, provided that the total thermal mass of all the layers is less than the thermal mass of the rear portion 26.

Figure 22:
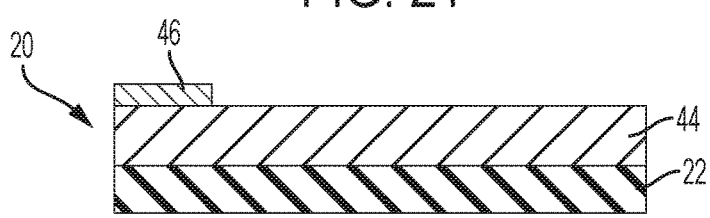
FIG. 22 is an example of a TWC having a phosphorus tolerant cerium oxide-based support material overlying a conventional TWC washcoat.
Figure 23:
FIG. 23 is an example of a TWC having a phosphorus resistant pre-phosphated support material overlying a conventional TWC washcoat.

With reference to FIGS. 22 and 23, TWCs 20 may be provided. These catalysts may not include a low thermal mass front portion 24, as described above. Instead, the TWC may include one or more washcoat layers 44 that may stretch the entire length of the substrate 22. The composition and structure of the washcoat layer(s) 44 may be similar to the washcoat layers described above for the rear portion 26, for example, conventional washcoat composition. With reference to FIG. 22, the TWC 20 may include an additional washcoat layer 46 disposed over the washcoat layer(s) 44. The washcoat layer 46 may be disposed at the front or initial portion of the TWC 20, similar to the front portion 24 in FIGS. 18-21. However, since the washcoat layer 46 is added to the layer(s) 44, the thermal mass of the front region may not be decreased, and may be increased.

The washcoat layer 46 may be the same or substantially the same as the washcoat layer 30 described above (e.g., cerium oxide-based). Accordingly, while the thermal mass of the TWC 20 may be increased, the washcoat layer 46 may provide the front region of the catalyst with a phosphorus tolerant washcoat layer. This layer may provide protection to the underlying layer(s), similar to the embodiment of FIG. 21, while remaining catalytically active.

With reference to FIG. 23, the TWC 20 may be the same or substantially the same as the TWC in FIG. 22, except that washcoat layer 48 replaces washcoat layer 46. Washcoat layer 48 may be the same or substantially the same as washcoat layer 32 described above (e.g., pre-phosphated). Similar to the TWC 20 of FIG. 22, the thermal mass of the front region may be increased, however, the washcoat layer 48 provides a phosphorus tolerant/resistant layer at the front of the catalyst that maintains its activity when exposed to phosphorus.

While the phosphorus tolerant or resistant washcoat layers described above have been disposed in a front or middle region of the TWC, these washcoats may also be located at other portions of the TWC. In at least one embodiment, the low washcoat loading layers may be use as stand-alone catalysts. For example, a catalyst may include a substrate, similar to above, and only a phosphorus tolerant washcoat layer or layers disposed thereon. The washcoat layer(s) may include the disclosed cerium oxide or pre-phosphated support materials. These catalysts may be low washcoat loading catalysts, for example, having a washcoat loading of less than 2.0 g/in$^3$, 1.5 g/in$^3$, or 1.0 g/in$^3$. In one embodiment, these P-tolerant catalysts may be utilized in volume-limited regions close to the engine, for example, as a manifold catalyst. In these regions, the rate of reactant diffusion to PGM sites at higher temperatures may be more important than the kinetic activity of the catalyst at low temperatures. Also, low washcoat loaded catalysts may reduce back pressure since the exhaust gas temperatures are highest close to the engine. An additional fully formulated (e.g., conventional) TWC may be provided downstream of the P-tolerant stand-alone catalyst.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A three-way catalyst, comprising:
   a substrate defining a plurality of channels;
   front and rear washcoat portions directly overlying the substrate and having respective first and second washcoat loadings, the second washcoat loading being at least 3.0 g/in$^3$, the front or rear washcoat portion being exposed on an upper side; and
   the front washcoat portion including a catalyst material loaded onto a support material comprising at least 85 wt. % of a cerium oxide and excluding alumina at a loading of at least 25 g/ft$^3$.

2. The three-way catalyst of claim 1, wherein the support material comprises at least 95 wt. % of a cerium oxide.

3. The three-way catalyst of claim 1, wherein the cerium oxide includes at least one of CeO$_2$ and a cerium zirconium oxide (CZO).

4. The three-way catalyst of claim 1, wherein the front washcoat portion and a portion of the substrate that it overlies comprise from 3 to 25 vol. % of the three-way catalyst.

5. The three-way catalyst of claim 1, wherein the front washcoat portion overlies up to 15% of an axial length of the substrate.

6. The three-way catalyst of claim 1, wherein the catalyst material includes a platinum group metal (PGM).

7. The three-way catalyst of claim 1, wherein the front washcoat portion and the rear washcoat portion together overlie substantially an entire axial length of the substrate.

8. A three-way catalyst, comprising:
   a substrate defining a plurality of channels;
   front and rear washcoat portions directly overlying the substrate and having respective first and second washcoat loadings; and
   the front washcoat portion being exposed on an upper side and including a catalyst material loaded onto a support material comprising at least 85 wt. % of a cerium oxide and excluding alumina at a loading of at least 25 g/ft$^3$.

9. The three-way catalyst of claim 8, wherein the support material comprises at least 95 wt. % of a cerium oxide.

10. The three-way catalyst of claim 8, wherein the cerium oxide includes at least one of CeO$_2$ and a cerium zirconium oxide (CZO).

11. The three-way catalyst of claim 8, wherein the front washcoat portion and a portion of the substrate that it overlies comprise from 3 to 25 vol. % of the three-way catalyst.

12. The three-way catalyst of claim 8, wherein the front washcoat portion overlies up to 15% of an axial length of the substrate.

13. The three-way catalyst of claim 8, wherein the catalyst material includes a platinum group metal (PGM).

14. A three-way catalyst, comprising:
   front and rear washcoat portions directly overlying a substrate and having respective first and second washcoat loadings, the rear washcoat portion being exposed on an upper side, the first washcoat loading being at most 1.5 g/in$^3$; and
   the front washcoat portion including a catalyst material supported on a support material comprising at least 85 wt. % of a cerium oxide and excluding alumina at a loading of at least 25 g/ft$^3$.

15. The three-way catalyst of claim 14, wherein the support material comprises at least 95 wt. % of a cerium oxide.

16. The three-way catalyst of claim 14, wherein the cerium oxide includes at least one of CeO$_2$ and a cerium zirconium oxide (CZO).

17. The three-way catalyst of claim 14, wherein the front washcoat portion and a portion of the substrate that it overlies comprise from 3 to 25 vol. % of the three-way catalyst.

18. The three-way catalyst of claim 14, wherein the front washcoat portion overlies up to 15% of an axial length of the substrate.

19. The three-way catalyst of claim 14, wherein the catalyst material includes a platinum group metal (PGM).

20. The three-way catalyst of claim 14, wherein the front washcoat portion and the rear washcoat portion together overlie substantially an entire axial length of the substrate.

* * * * *